Patented May 3, 1949

2,469,017

UNITED STATES PATENT OFFICE 2,469,017

METHOD OF TERMINATING THE POLYMERIZATION OF BUTADIENE-1,3 HYDROCARBONS

Sherman A. Sundet, Akron, Ohio, assignor to The B. F. Goodrich Company, New York, N. Y., a corporation of New York No Drawing. Application June 8, 1945,
Serial No. 598,408

3 Claims. (Cl. 260—84.3)

This invention relates to the polymerization in aqueous emulsion of butadiene-1,3 hydrocarbons and particularly to an improved method of terminating or stopping such polymerizations at any desired point short of completion.

In the production of synthetic rubber by the polymerization in aqueous emulsion of a monomeric butadiene-1,3 hydrocarbon such as butadiene-1,3 in admixture if desired with a copolymerizable monomer such as styrene, it is generally advantageous to terminate the polymerization before its completion in order that synthetic rubber polymers of the most desirable properties are obtained. This is ordinarily accomplished by adding to the emulsion at the proper stage of the polymerization a small amount of a polymerization inhibitor, usually hydroquinone or quinone, after which the emulsion or dispersion is treated to remove the unpolymerized monomers and is then coagulated to yield the synthetic rubber in solid form. Several disadvantages, however, have been found to accompany this procedure. The inhibitor often has a deleterious effect on the properties of the synthetic rubber; for example, it has been found that the ability of butadiene-1,3 styrene synthetic rubber to undergo heat softening is adversely influenced by this procedure. In addition, termination of the polymerization is often not abrupt nor permanent in nature, particularly when attempted after only a relatively small proportion of the total monomer has been converted into polymer, with the result that further polymerization may occur during the treatment to remove unpolymerized monomers or prior thereto if this operation is not immediately effected. The use of larger amounts of inhibitor somewhat alleviates this difficulty but is undesirable because of the high cost of hydroquinone and quinone.

The principal object of this invention is to overcome these disadvantages and to provide an efficient and economical method of terminating the polymerization in aqueous emulsion of monomeric materials comprising a butadiene-1,3 hydrocarbon.

I have discovered that these and other objects are attained by utilizing, as agents for terminating the emulsion polymerization of butadiene-1,3 hydrocarbons, a combination of a small amount of a water-soluble sulfide such as hydrogen sulfide, ammonium sulfide, or the sulfides or hydrosulfides of alkali and alkaline earth metals, and a small amount of an organic compound possessing a quinonoid structure such as quinone, or an organic compound oxidizable to a quinonoid structure such as hydroquinone.

In the practice of the invention an aqueous emulsion containing monomeric material comprising a butadiene-1,3 hydrocarbon undergoing polymerization, and also containing an emulsifying agent to emulsify the monomeric material and disperse the polymer in the aqueous phase, and, preferably, an oxidizing agent to assist in bringing about the polymerization, is treated at any desired time during the polymerization, for example, when about 20 to 80 percent of the monomer has been converted to polymer, with quinone or hydroquinone or a similar compound having, or giving upon oxidation, a quinonoid structure, and with a water-soluble sulfide. The effect of this treatment is that the polymerization abruptly and permanently ceases, even when the conversion of monomer to polymer is as low as 20% or lower and when only minute quantities of the treating agents are employed. After the treatment, the aqueous dispersion containing polymer and unpolymerized monomer may be allowed to stand indefinitely and it may be treated to remove unpolymerized monomers, without danger of further polymerization. Furthermore, when the dispersion is finally coagulated polymers of uniformly high quality are secured.

To illustrate the method of this invention an aqueous emulsion, such as is conventionally used in the preparation of butadiene-1,3 styrene synthetic rubber, is prepared from the following ingredients:

| | Parts |
|---|---|
| Butadiene-1,3 | 75 |
| Styrene | 25 |
| N-dodecyl mercaptan | 0.30 |
| Potassium persulfate | 0.30 |
| Fatty acid soap | 5.0 |
| Water | 180 |

In such an emulsion, butadiene-1,3 and styrene are the polymerizable materials, or monomeric material, and are present in the emulsified phase; n-dodecyl mercaptan is a polymerization modifier the presence of which increases the plasticity and solubility of the polymeric product; potassium persulfate is an oxygen supplying agent or oxidant which initiates or brings about the polymerization, and the soap is an emulsifying agent to emulsify the monomers and disperse the polymer in the aqueous phase. When this emulsion is agitated in a closed system at 50° C. for about 4 hours, about 25% of the monomers are converted into polymer; when agitated for about 8 hours, about 70% of the monomers are converted into polymer, and if agitated for about 32 hours the polymerization is substantially complete with about 95% of monomer converted to polymer.

In one embodiment of the invention, an aqueous solution containing 0.033 part of hydroquinone and 0.052 part of sodium sulfide is added to this emulsion after polymerization for 4 hours at 50° C., or at a conversion of 25%. The emulsion is then held at 50° C. for an additional 60 hours but the conversion of monomer to polymer after this time is still only 25%, thus illustrating the remarkable efficiency of the combination of hydroquinone and sodium sulfide in terminating the polymerization. When the hydroquinone is employed without the sulfide the conversion remains at 25 to 30% for about 8 hours after the addition but the polymerization proceeds to about 60% conversion within an additional 12 hours at 50° C. Similarly, when the sulfide is used without hydroquinone the polymerization proceeds to 60% conversion within 4 hours after the addition.

In another embodiment of the invention an aqueous solution containing 0.022 part of hydroquinone and 0.05 part of sodium sulfide is added to an emulsion of the same character as used in the previous embodiment after polymerization for 8 hours at 50° C., or at a conversion of about 70%. The polymerization is immediately terminated and no further polymerization occurs after the emulsion is held for an additional 48 hours at 50° C. When either hydroquinone or the sulfide is used alone, however, the polymerization proceeds to about 90% conversion in this time.

The dispersions containing polymer and unpolymerized monomer obtained in either of the above embodiments may be treated to remove unpolymerized butadiene-1,3, which may be accomplished merely by releasing the pressure under which the polymerization is effected, and they may be steam distilled to remove the higher-boiling unpolymerized styrene. After these operations and after the addition of an antioxidant to protect the polymer against oxidation, if desired, they may be coagulated in the usual manner, as by the addition of acid or salt, to produce butadiene-styrene synthetic rubbers. These synthetic rubbers are strong coherent materials which resemble natural rubber, and which may be readily heat-softened or "broken-down" by heating them in an atmosphere of air or oxygen for about 1 to 5 hours at 100 to 150° C., differing in this respect from synthetic rubbers prepared in a similar way except that only hydroquinone, and this in larger amounts, is used in terminating the polymerization, since such latter synthetic rubbers are often resistant to heat-softening.

Results entirely equivalent to those described may be secured when sodium sulfide is replaced by other sulfides which are water-soluble and which will therefore enter the aqueous phase of the emulsion and there perform the function of reducing the oxidizing agents present therein, and when hydroquinone is replaced by other compounds the effect of which is to provide a compound having a quinonoid structure in the non-aqueous butadiene-1,3 hydrocarbon containing phase of the emulsion. When hydroquinone is used it is oxidized in the aqueous phase to quinone which is then extracted by the hydrocarbon phase. The addition of hydroquinone to the aqueous phase is thus an indirect but convenient method of supplying quinone to the non-aqueous phase. It is also possible to add quinone directly to the emulsion and thereby obtain the same results. Similarly other compounds having a quinonoid structure, which may be either ortho or para in nature, including ortho-benzoquinone, toluquinones, naphthoquinones, anthraquinone, diphenoquinone, chloranil, hydroxy quinones, amino quinones, quinone imides, quinone diimides, quinone chlorimides and dichlorimides, quinone monoximes and dioximes, methylene quinones, quinone monoanils and dianils, quinone diphenyl methanes and the like, may be added directly to the emulsion as such or dissolved in a suitable solvent, or they may be supplied to the non-aqueous phase of the emulsion indirectly by the addition of compounds which are oxidized thereto such as various ortho and para amino phenols, ortho and para dihydroxy phenols, aromatic primary and secondary amines and diamines and the like. For example, excellent results are secured by the addition of p-tertiary butyl catechol, ortho and para amino phenol, p-phenylene diamine, and p-hydroxy diphenyl amine all of which are oxidized to compounds possessing a quinonoid structure, together with a water-soluble sulfide, to the emulsion.

The amounts of the sulfide and the quinonoid compound supplied to the emulsion may be varied considerably but in general it is preferred to use only small amounts of each of these substances, for example less than 0.1% by weight based on the total amount of monomer originally used in the polymerization. In particular, it is advantageous to employ only 0.001 to 0.05 percent by weight based on the original monomers of the quinonoid compound, or of a compound oxidizable thereto, both for purposes of economy and because of the undesirable effects of larger amounts of such substances on the properties of the polymer. The amount of the sulfide will depend upon the quantity of oxidizing agents present in the emulsion at the time of the addition, it being preferred to add an amount of sulfide just sufficient to reduce the oxidizing agents. Ordinarily, this will be from about 0.01 to 0.2% by weight based on the original monomers. An excess of sulfide is preferably avoided because of the undesirable and hazardous liberation of hydrogen sulfide when acid is added to coagulate the dispersion.

Variations may also be effected in the manner of addition of the terminating agents. For example, they may be added simultaneously in aqueous solution if both are water-soluble, as in the embodiments specifically described, or they may be added separately one after the other, as such, in solution in an organic solvent, in dispersion or in any other convenient manner. If added separately, a compound oxidizable to a quinonoid structure should not be added after the sulfide since enough oxidizing agent to produce the quinonoid structure must be present at the time of its addition.

In addition to these variations and modifications in the nature, amount and mode of addition of the terminating agents, it is, of course, also possible to utilize emulsions of butadiene-1,3 hydrocarbons undergoing polymerization other than the one hereinabove specifically described, and still efficiently terminate the polymerization. Thus, the emulsion may contain, as the material undergoing polymerization, and in the emulsified phase, any desired butadiene-1,3 hydrocarbon such as butadiene-1,3, isoprene, 2,3-dimethyl butadiene-1,3, piperylene or the like either alone or in admixture with one another or in admixture with other unsaturated compounds copolymerizable therewith in aqueous emulsion such as styrene, chloro styrenes, alkoxy styrenes, acrylonitrile, methyl acrylate, methyl methacrylate, vinylidene chloride, vinyl pyridines, isobutylene, ethylene, chloroprene and the like. It may contain any desired emulsifying agent such as fatty acid and rosin acid soaps, hymolal sulfates and sulfonates, aryl sulfonates, salts of long chain aliphatic bases and the like. Furthermore, the oxidizing agent present in the emulsion may be varied widely but ordinarily a peroxygen compound such as hydrogen peroxide, an alkali metal or ammonium persulfate or perborate or the like is used. Other additions such as various modifiers of polymerization, catalysts of polymerization, etc., may be present in the emulsion undergoing polymerization if desired.

Numerous other modifications and variations in the invention will be apparent to those skilled in the art and are within the spirit and scope of the appended claims.

I claim:

1. In a process wherein a monomeric butadiene-1,3 hydrocarbon is polymerized in aqueous emulsion in the presence of a peroxygen compound, the step which comprises supplying to the emulsion, at a time when 20 to 80% of the monomeric material is polymerized and the remainder thereof remains unpolymerized, an organic compound possessing the quinonoid structure and a water-soluble inorganic sulfide of the class consisting of hydrogen sulfide, ammonium sulfide and alkali metal sulfides and hydrosulfides, the said compound of quinonoid structure being supplied to the emulsion at least as soon as the said sulfide and in an amount from 0.001 to 0.05% by weight based on the amount of monomeric material originally present in the emulsion before polymerization, and the said sulfide being supplied to the emulsion in an amount from 0.01 to 0.2% by weight based on the amount of monomeric material originally present in the emulsion, whereby further polymerization of monomeric material is immediately terminated, and the unpolymerized monomeric material present in the emulsion permanently remains in the monomeric state.

2. In a process wherein a monomeric mixture of butadiene-1,3 and styrene is polymerized in aqueous emulsion in the presence of substantially 0.3% by weight based on the monomeric material of potassium persulfate, the step which comprises adding to the emulsion, at a time when 20 to 80% of the monomeric material is polymerized and the remainder thereof remains unpolymerized, a combination of hydroquinone and a water-soluble inorganic sulfide selected from the class consisting of hydrogen sulfide, ammonium sulfide and alkali metal sulfides and hydrosulfides, the hydroquinone being added to the emulsion at least as soon as the said sulfide and in an amount from 0.001 to 0.05% by weight based on the amount of monomeric material originally present in the emulsion before polymerization, and the said sulfide being added in an amount from 0.01 to 0.2% by weight based on the amount of monomeric material originally present in the emulsion which amount is just sufficient to reduce the persulfate present in the emulsion at the time of sulfide addition, whereby further polymerization of monomeric material is immediately terminated and the unpolymerized monomeric material present in the emulsion permanently remains in the monomeric state.

3. In a process wherein a monomeric mixture containing substantially 75 parts by weight of butadiene-1,3 and substantially 25 parts by weight of styrene is polymerized in aqueous emulsion in the presence of substantially 0.3 part by weight of potassium persulfate, the step which comprises adding to the emulsion, at a time when substantially 70% of the monomeric mixture is polymerized, an aqueous solution containing substantially 0.022 part of hydroquinone and substantially 0.05 part of sodium sulfide, whereby further polymerization of monomeric material is immediately terminated and the unpolymerized monomeric material present in the emulsion permanently remains in the monomeric state.

SHERMAN A. SUNDET.

REFERENCES CITED

The following references are of record in the file of this patent:

UNITED STATES PATENTS

| Number | Name | Date |
| --- | --- | --- |
| 2,262,002 | Hopf | Nov. 11, 1941 |
| 2,323,313 | Dennstedt | July 6, 1943 |